United States Patent
Okazaki et al.

(10) Patent No.: US 10,915,438 B2
(45) Date of Patent: Feb. 9, 2021

(54) SOFTWARE-TESTING DEVICE, SOFTWARE-TESTING SYSTEM, SOFTWARE-TESTING METHOD, AND PROGRAM

(71) Applicant: Mitsubishi Heavy Industries Engineering, Ltd., Kanagawa (JP)

(72) Inventors: Hirotaka Okazaki, Tokyo (JP); Noritaka Yanai, Tokyo (JP); Masahiro Yamada, Tokyo (JP); Yutaka Miyajima, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 0 days.

(21) Appl. No.: 16/481,485

(22) PCT Filed: Feb. 16, 2018

(86) PCT No.: PCT/JP2018/005583
§ 371 (c)(1),
(2) Date: Jul. 29, 2019

(87) PCT Pub. No.: WO2018/151277
PCT Pub. Date: Aug. 23, 2018

(65) Prior Publication Data
US 2019/0391910 A1   Dec. 26, 2019

(30) Foreign Application Priority Data

Feb. 17, 2017 (JP) .................. 2017-027927

(51) Int. Cl.
G06F 11/36 (2006.01)
G05B 19/05 (2006.01)
G06F 8/51 (2018.01)

(52) U.S. Cl.
CPC ........ *G06F 11/3688* (2013.01); *G05B 19/056* (2013.01); *G06F 8/51* (2013.01); *G06F 11/3664* (2013.01); *G05B 2219/13022* (2013.01)

(58) Field of Classification Search
CPC ........ G06F 16/26; G06F 16/93; G06F 16/248; G06F 16/906; G06F 16/9038;
(Continued)

(56) References Cited

U.S. PATENT DOCUMENTS 5,613,115 A * 3/1997 Gihl ................ G05B 19/056
717/123
5,758,123 A   5/1998 Sano et al.
(Continued)

FOREIGN PATENT DOCUMENTS

CA    2567220 A1    5/2007
CN    101388101 B *  6/2013   ......... G05B 19/0426
(Continued)

OTHER PUBLICATIONS

Alphonsus et al., "A reviewontheapplicationsofprogrammablelogic controllers(PLCs)", Jan. 2016, Elsevier Ltd. (Year: 2016).*
(Continued)

*Primary Examiner* — Wei Y Zhen
*Assistant Examiner* — Junchun Wu
(74) *Attorney, Agent, or Firm* — Kanesaka Berner and Partners LLP

(57) ABSTRACT

A software-testing device includes a conversion unit configured to convert a PLC program for operating a programmable logic controller into a general-purpose language program described in a general-purpose programming language, and a test execution unit configured to perform a test on the general-purpose language program.

11 Claims, 8 Drawing Sheets

(58) Field of Classification Search
CPC ........... G06F 16/90332; G06F 16/9035; G06F 16/9024; G06F 11/3688; G06F 11/3664; G06F 2216/11; G06F 8/51; G06Q 50/184; G05B 19/056; G05B 2219/13022
See application file for complete search history.

(56) References Cited

U.S. PATENT DOCUMENTS

| | | | | |
|---|---|---|---|---|
| 5,905,891 | A * | 5/1999 | Harada | G05B 19/056 717/114 |
| 5,991,533 | A * | 11/1999 | Sano | G06F 30/33 703/28 |
| 6,857,110 | B1 * | 2/2005 | Rupp | G06F 30/30 716/136 |
| 7,003,733 | B2 * | 2/2006 | Duemler | G05B 19/056 700/18 |
| 8,051,410 | B2 * | 11/2011 | Marfatia | G06F 8/76 717/137 |
| 2002/0059567 | A1 * | 5/2002 | Minamide | G06F 8/51 717/151 |
| 2003/0149608 | A1 * | 8/2003 | Kall | G06Q 10/063 705/7.27 |
| 2005/0010897 | A1 * | 1/2005 | Ogawa | G06F 8/30 717/106 |
| 2005/0171624 | A1 * | 8/2005 | Nagashima | G05B 19/058 700/23 |
| 2009/0083719 | A1 | 3/2009 | Hsieh | |
| 2009/0265692 | A1 * | 10/2009 | Godefroid | G06F 11/3688 717/128 |
| 2010/0313128 | A1 * | 12/2010 | Phillips | G05B 19/05 715/715 |
| 2012/0116561 | A1 * | 5/2012 | Nakagawa | G06F 11/3664 700/97 |
| 2014/0046457 | A1 * | 2/2014 | Taber | G05B 19/056 700/2 |
| 2015/0058828 | A1 * | 2/2015 | Narutani | G05B 17/02 717/135 |
| 2015/0248506 | A1 * | 9/2015 | Hartley | G05B 19/41815 703/21 |
| 2016/0283353 | A1 * | 9/2016 | Owen | G06F 11/3692 |
| 2017/0286270 | A1 * | 10/2017 | Hufnagel | G06F 11/3688 |
| 2018/0181485 | A1 | 6/2018 | Simbara et al. | |
| 2018/0373218 | A1 * | 12/2018 | Wang | G06F 8/51 |

FOREIGN PATENT DOCUMENTS

| | | | | |
|---|---|---|---|---|
| JP | 3018912 | B2 | 3/2000 | |
| JP | 2002099312 | A | 4/2002 | |
| JP | 2007133622 | A | 5/2007 | |
| JP | 4905597 | B1 * | 3/2012 | G06F 11/3423 |
| JP | 2015176230 | A | 10/2015 | |
| KR | 100877572 | B1 * | 1/2009 | |
| WO | 2013161057 | A1 | 10/2013 | |
| WO | 2016174743 | A1 | 11/2016 | |

OTHER PUBLICATIONS

Kim et al., "A Translation Method for Ladder Diagram with Application to a Manufacturing Process", 1999, IEEE (Year: 1999).*
Chang et al., "An Editing System Converting a UML State Diagram to a PLC Program", 2013, Springer-Verlag Berlin Heidelberg (Year: 2013).*
Estévez et al., "Automatic generation of PLC automation projects from component-based models", Jul. 2007, Springer-Verlag London (Year: 2007).*
Wang et al., "Development of a Distributed Control System for PLC-Based Applications", Jul. 2010, IEEE (Year: 2010).*
Basile et al., "On the Implementation of Industrial Automation Systems Based on PLC", Oct. 2013, IEEE, vol. 10, No. 4 (Year: 2013).*
Tokumoto et al., "The Application of C/C++ symbolic execution tool KLEE and the development of KLEE-CPPUNIT cooperation tool", Information Processing Society of Japan, Digital Library, Embedded System Symposium; 2011, pp. 23-1 to 23-8; 10pp.
International Search Report and Written Opinion for International Application No. PCT/JP2018/005583 dated May 15, 2018; 17pp.

* cited by examiner

| VARIABLE NAME | TYPE | LOWER LIMIT | UPPER LIMIT |
|---|---|---|---|
| x | REAL | 0 | 10000 |
| y | REAL | 0 | 100 |

SOFTWARE-TESTING DEVICE, SOFTWARE-TESTING SYSTEM, SOFTWARE-TESTING METHOD, AND PROGRAM

RELATED APPLICATIONS

The present application is a National Phase of International Application Number PCT/JP2018/005583 filed Feb. 16, 2018 and claims priority to Japanese Application Number 2017-027927 filed Feb. 17, 2017.

TECHNICAL FIELD

The present invention relates to a software-testing device, a software-testing system, a software-testing method, and a program.

Priority is claimed on Japanese Patent Application No. 2017-27927, filed Feb. 17, 2017, the content of which is incorporated herein by reference.

BACKGROUND ART

Several techniques in association with a test of a program executed by a programmable logic controller (PLC) have been proposed.

For example, Patent Literature 1 shows a verification support system for inspecting a sequence program that operates a PLC. The verification support system converts the sequence program into a PLC sequence program described in a hardware description language. In addition, the verification support system includes an execution model that is described in a hardware description language to execute a PLC function in a simulation manner, and a control target model described in a hardware description language to execute a function of the control target in a simulation manner. In addition, the verification support system constitutes a virtual sequence control system, executes the PLC sequence program, and performs debugging.

CITATION LIST

Patent Literature

[Patent Literature 1]
Japanese Patent No. 3018912

SUMMARY OF INVENTION

Technical Problem

Patent Literature 1 does not mention coverage. In a case in which the coverage is low, there is a possibility that a bug may remain in a path which did not pass in the test.

The present invention provides a software-testing device, a software-testing system, a software-testing method, and a program capable of improving coverage in a test of a program executed by a PLC.

Solution to Problem

According to a first aspect of the present invention, a software-testing device includes a conversion unit configured to convert a PLC program for operating a programmable logic controller into a general-purpose language program described in a general-purpose programming language, and a test execution unit configured to perform a test on the general-purpose language program.

The conversion unit may convert a description satisfying a predetermined condition among descriptions included in a comment in the PLC program into a description that is to be an execution target by the general-purpose language program.

The conversion unit may convert the description satisfying the predetermined condition among the descriptions included in the comment in the PLC program into a description to be executed at a time of a test by the general-purpose language program.

The conversion unit may convert a first character string included in the comment in the PLC program into a description indicating a precondition for executing the general-purpose language program, and convert a second character string included in the comment in the PLC program into a description indicating a condition to be satisfied after the execution of the general-purpose language program, and the test execution unit may detect, as an error, a case in which an input to the general-purpose language program satisfies a condition of the input and an output of the general-purpose language program does not satisfy a condition of the output.

The software-testing device may include a range information acquisition unit configured to acquire range information indicating an assumption range of a value of a global variable included in the PLC program. The test execution unit may detect a case in which the value of the global variable is out of the assumption range, as an error.

The test execution unit may perform the test using a symbol execution method.

The test execution unit may calculate a variable value in a case in which a path is executed for each of the paths equal to or less than a designated step number among the paths in the PLC program using the general-purpose language program, and may detect a case in which a variable value in any of the paths does not satisfy a condition indicated by the PLC program, as an error.

The software-testing device may include a display unit configured to display the PLC program and showing an execution place in the general-purpose language program on display of the PLC program.

In a case in which the conversion unit converts a subroutine call in the PLC program into a description in the general-purpose language program, the conversion unit may add an entry condition indicated in a subroutine called by the PLC program in the general-purpose language program on a subroutine call side as a condition at a time of the subroutine call, and may add an exit condition indicated in the subroutine called by the PLC program in the general-purpose language program on a subroutine call side as a condition at a time of return from the subroutine call, and the test execution unit may perform a unit test of the general-purpose language program on the subroutine call side using the condition at the time of the subroutine call and the condition at the time of the return from the subroutine call.

In a case in which the test execution unit executes the test, the test execution unit may cut out the path that did not pass in the test and perform the test on the cut out path.

According to a second aspect of the present invention, a software-testing system includes any of the software-testing devices described above, a PLC simulation unit configured to execute the general-purpose language program converted from the PLC program by the software-testing device, and a control target simulation unit configured to simulate a control target by a PLC.

According to a third aspect of the present invention, a software-testing method includes converting a PLC program for operating a programmable logic controller into a general-purpose language program described in a general-purpose programming language, and performing a test on the general-purpose language program.

According to a fourth aspect of the present invention, a program causes a computer to execute converting a PLC program for operating a programmable logic controller into a general-purpose language program described in a general-purpose programming language, and performing a test on the general-purpose language program.

Advantageous Effects of Invention

According to the software-testing device, the software-testing system, the software-testing method, and the program described above, it is possible to improve coverage in a test of a program executed by a PLC.

DESCRIPTION OF EMBODIMENTS

Hereinafter, an embodiment of the present invention will be described, but the following embodiment does not limit the invention according to the claims. In addition, not all combinations of features described in the embodiment are essential to the solution of the invention.

Figure 1:
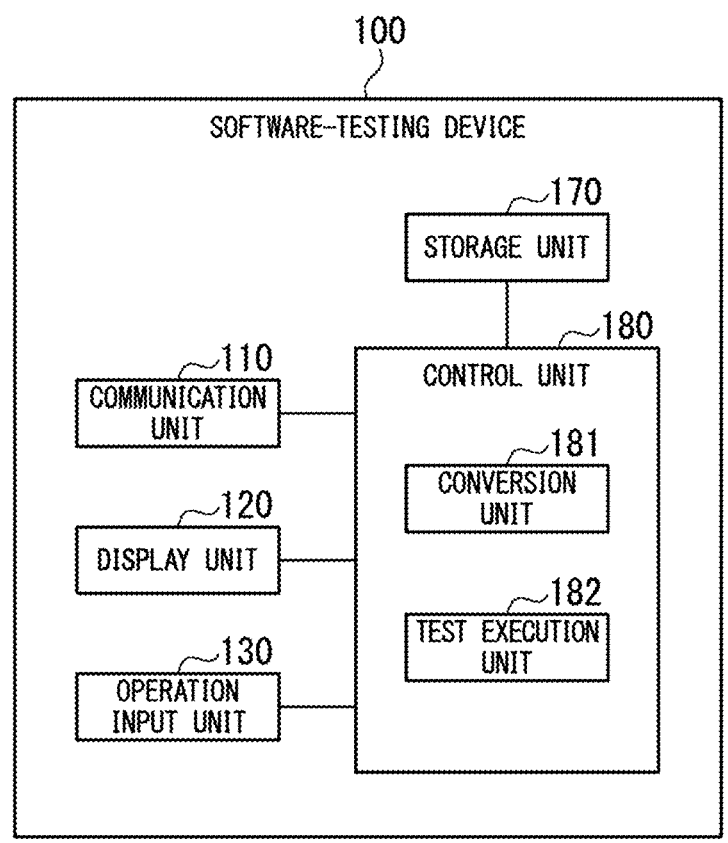
FIG. 1 is a schematic block diagram showing a functional constitution of a software-testing device according to an embodiment.

FIG. 1 is a schematic block diagram showing a functional constitution of a software-testing device according to the embodiment. As shown in FIG. 1, the software-testing device 100 includes a communication unit 110, a display unit 120, an operation input unit 130, a storage unit 170, and a control unit 180. The control unit 180 includes a conversion unit 181 and a test execution unit 182.

The software-testing device 100 performs a test such as a bug detection on a program executed by a PLC. Hereinafter, the program executed by the PLC is referred to as a PLC program. In addition, a description language of a source code of the PLC program is referred to as a PLC language. As the PLC language, for example, a ladder (LD) language, a sequential function chart (SFC), a function block diagram (FBD), and a structured text (ST) can be exemplified. The ladder language is also referred to as a ladder logic or simply a ladder. The function block diagram is also referred to as a function block.

However, a programming language that is to be a test target by the software-testing device 100 is not limited to these, and any programming language may be used as long as the programming language is a description language of the program executed by the PLC.

In a case of the PLC program, a test of a complex program cannot be performed sufficiently in the following points.

(1) It is not possible to carry out an exhaustive test.

In general program development, a test of a system including a program is performed sequentially from small units such as a unit test, a combinational test, a hardware connection test, and a system test.

In the unit test, for example, the test is performed for each part of the program, such as for each subroutine. In the combinational test, the test is performed by combining a plurality of parts of the program, such as calling a subroutine from a main routine. In the hardware connection test, the test is performed by installing a program on actual machine hardware. The actual machine hardware referred to here is hardware that is actually used in the system. In the system test, an operation test of the entire system is performed.

On the other hand, in a case of the PLC language, an environment for performing the unit test and the combination test is generally not ready. Therefore, in the test of the PLC program, a system test using an actual PLC is often performed from the beginning. In this case, with regard to the unit test and the like, the system test is virtually performed by limiting a part of functions of the system.

In the unit test in the general program development, a white box test is often performed in which a test case is set so that coverage for the entire source code approaches 100% as far as possible. The test case referred to here is a combination of inputs to the program.

It is possible to increase the coverage by selecting the combination of inputs so that all of the paths of the program are passed as much as possible.

In a case in which the program of the test target is complicated and the test case becomes large, techniques such as an automatic unit test, automatic generation of a test case, and verification of bug by a proof technique are used. In the automatic unit test, the test environment automatically executes a number of automatically set test cases. The test environment referred to here is a system for testing, such as a computer that executes debugging software. In the automatic generation of the test case, the test environment automatically generates the test case for achieving high coverage using a symbol execution method or the like, and automatically executes a test using the generated test case. In the verification of a bug by the proof technique, the test environment logically analyzes the program and detects the bug or determines the presence or absence of the bug.

On the other hand, in a case of the PLC program, as described above, in general, a unit test is not performed, and therefore, a white box test in the unit test is also not performed. In particular, in a case of the PLC program, since the environment for carrying out the unit test or the like is not ready as described above, it is difficult to apply techniques such as the automatic unit test, the automatic generation of the test case, and the verification of the bug by the proof technique.

It may be conceived that a path in which a test is not performed remains in the program and a bug remains in the path by not performing the white box test in the unit test. In this regard, in a case of the PLC program, it is not possible to sufficiently execute a test of a complex program.

(2) A method of testing the PLC program is limited.

In a case in which a program of a general-purpose language such as a C language is tested by a general computer such as a personal computer (PC), for example, various methods such as step execution, variable value monitoring, and program execution with overwriting of a variable value can be used. The general-purpose language referred to here is a language that is not specialized for a specific application. In addition, the general computer referred to here is a computer that is not specialized for a specific application.

Differently from a case in which the program of the general-purpose language described above is debugged by the general computer, in general, a function and a command for the program test is not sufficiently prepared in the PLC and methods that can be used when testing the PLC program are limited. In addition, differently from a case of the general-purpose language, in general, software for testing the PLC program by the general computer is also not known. Also in this regard, the methods that can be used when testing the PLC program are limited.

As described above, since the methods that can be used when testing the PLC program are limited, it is not possible to sufficiently execute the test of the complex program.

As described above, in the case of the PLC program, the software-testing device 100 generally converts the source code of the PLC program (described in the PLC language) into a source code of a general-purpose language on a general computer and performs a test to cope with a problem in which it is not possible to sufficiently execute the test of the complex program. That is, the software-testing device 100 converts the PLC program into the general-purpose language program at a source code level, and performs the test on the obtained general-purpose language program. Therefore, the software-testing device 100 can perform a test of a program using various existing software.

For example, the software-testing device 100 converts a source code of an ST (structured text) into a source code of a C language on a personal computer. Therefore, the software-testing device 100 can use existing software for testing the source code of the C language on the personal computer. Thus, it is possible to sufficiently execute the test of the complicated program.

Furthermore, the software-testing device 100 provides a function for increasing accuracy of debugging as described later.

In the following, a case in which the software-testing device 100 is constituted using a personal computer and the software-testing device 100 converts the source code of the ST into the source code of the C language will be described as an example. However, the general computer constituting the software-testing device 100 is not limited to a personal computer, and may be a computer to which existing software for a test of a program of a general-purpose language can be applied. In addition, the PLC language targeted by the software-testing device 100 is not limited to the ST, and may be various PLC languages. The language for which the software-testing device 100 converts the PLC program is not limited to the C language, and may be a language that can use existing software for performing the test of the source code of the language.

The communication unit 110 communicates with other apparatuses. For example, the communication unit 110 may receive the source code of the ST that is the test target from a computer used as an editor of the PLC program.

The display unit 120 includes a display screen such as a liquid crystal panel or a light-emitting diode (LED) panel to display various images.

The operation input unit 130 includes, for example, an input device such as a keyboard and a mouse, and receives a user operation.

The storage unit 170 stores various pieces of data. For example, the storage unit 170 stores the source code of the ST that is the test target, a grammar definition for the conversion unit 181 to perform a syntax analysis on the source code, a syntax tree obtained by the syntax analysis, the source code of the C language obtained by converting the source code of the ST by the conversion unit 181, and the like.

The storage unit 170 is constituted using a storage device included in the software-testing device 100.

The control unit 180 controls each unit of the software-testing device 100 to execute various processes. The control unit 180 is constituted by a central processing unit (CPU) included in the software-testing device 100 that reads a program from the storage unit 170 and executes the program.

The conversion unit 181 converts the source code of the ST into the source code of the C language.

The test execution unit 182 performs a test on the source code of the C language obtained by the conversion of the conversion unit 181. The source code of the C language and the source code of the ST share the syntax tree, and each part of the source code of the C language is associated with each part of the source code of the ST. Therefore, in a case in which it is possible to specify a position of a bug on the source code of the C language, it is possible to specify a position of a bug on the source code of the ST.

Figure 2:
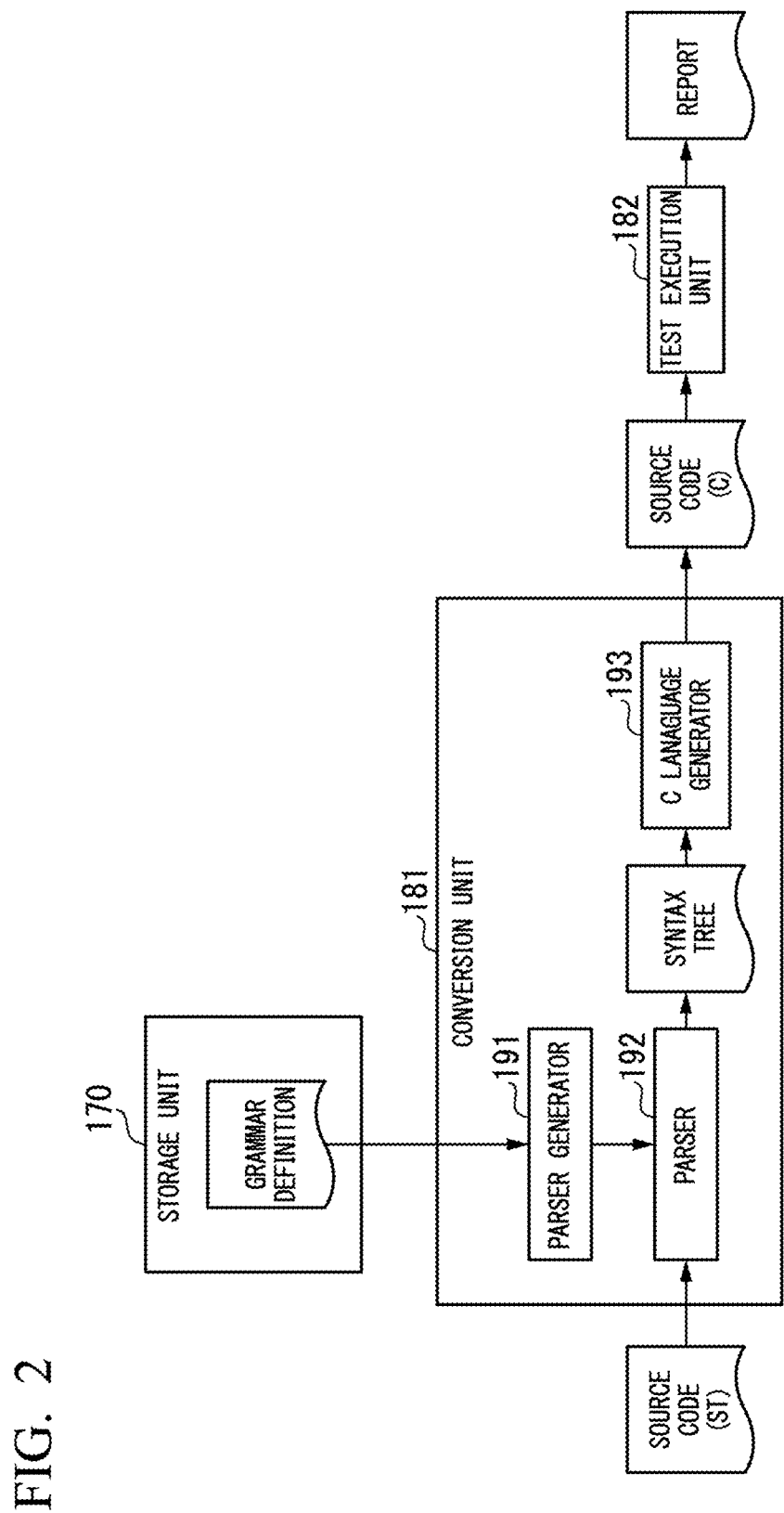
FIG. 2 is a diagram showing an example of a process procedure in which a software-testing system performs a test of a PLC program according to the embodiment.

FIG. 2 is a diagram showing an example of a process procedure in which the software-testing system 1 performs the test of the PLC program. In the example of FIG. 2, the conversion unit 181 functions as a parser generator 191, a parser 192, and a C language generator 193.

The parser generator 191 generates the parser 192 with reference to the grammar definition stored in the storage unit 170. The grammar definition stored in the storage unit 170 may be described in a backus naur form (BNF), but is not limited to a specific expression form.

In a case in which the source code of the ST is input to the conversion unit 181, the parser 192 performs parsing of the source code to generate the syntax tree. The parser generator 191 does not have to generate the parser 192 every time the source code of the ST is input to the conversion unit 181, and the same parser 192 may perform parsing repeatedly.

In a case in which the parser 192 generates the syntax tree, the C language generator 193 uses the syntax tree to generate the source code of the C language.

The test execution unit 182 performs the test on the source code of the C language generated by the C language generator 193, and outputs a test result as a report.

Figure 3:
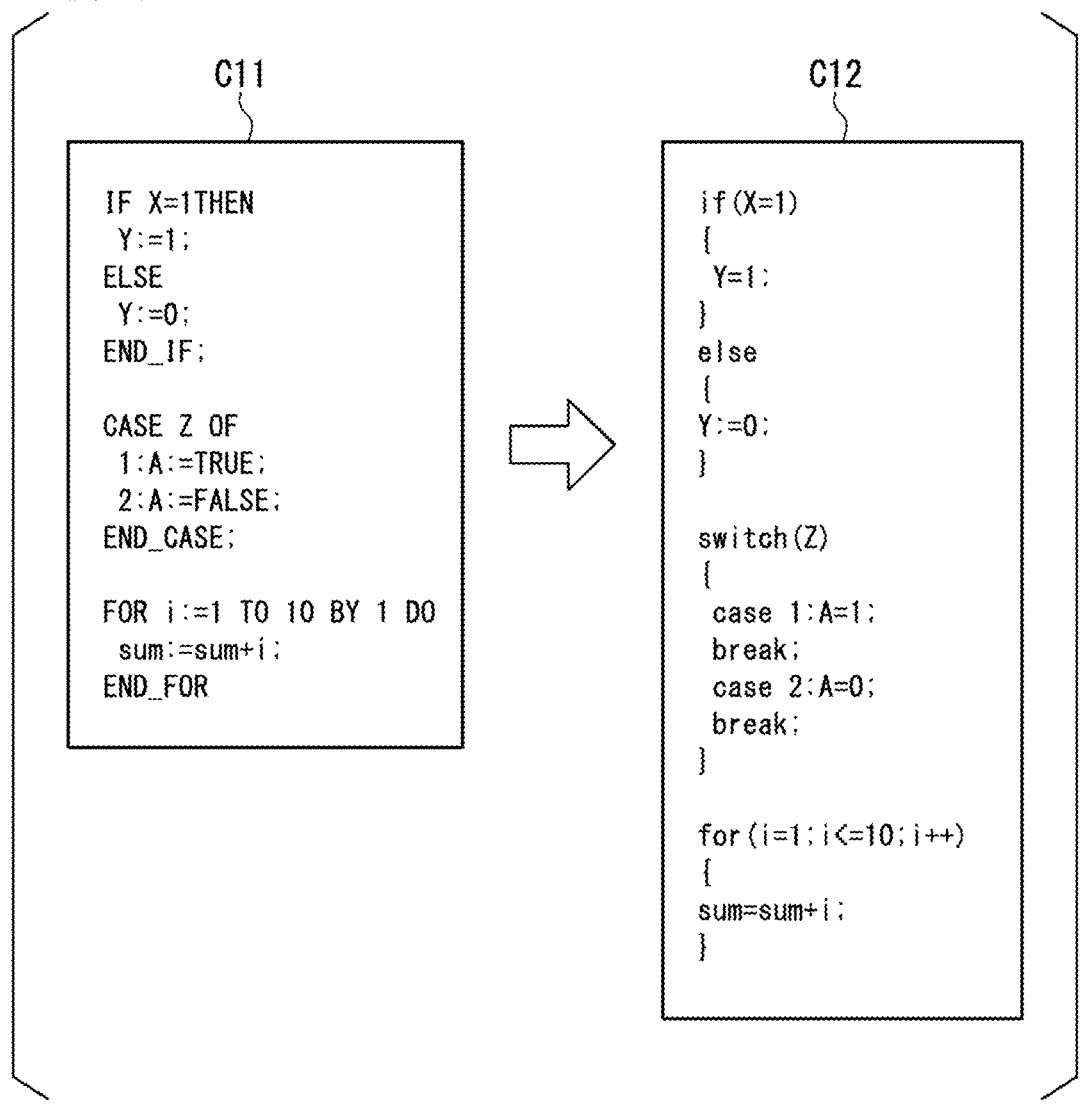
FIG. 3 is a diagram showing a first example of program conversion by the software-testing device according to the embodiment.

FIG. 3 is a diagram showing a first example of program conversion by the software-testing device 100. In the example of FIG. 3, a source code C11 of the ST is a source code before the conversion by the conversion unit 181, and a source code C12 of the C language is a source code after the conversion by the conversion unit 181. The conversion unit 181 generates the source of the C language indicating the same operation as the source code of the ST, such as converting IF statement, CASE statement, and FOR loop of the ST into IF statement, CASE statement (SWITCH statement), and FOR loop of the C language, respectively.

As described above, the conversion unit 181 converts the PLC program into the general-purpose language program at the source code level. In addition, the test execution unit 182 performs the test on the general-purpose language program obtained by the conversion.

The conversion unit 181 can efficiently perform the test using the existing test tool for the general-purpose language program by converting the PLC program into the general-purpose language program. For example, the conversion unit 181 can efficiently perform the test using the existing test tool for the C language by converting the source code of the ST into the source code of the C language on the personal computer.

Here, the conversion unit 181 may convert a part of the description included in the comment in the source code of the ST into a description that is to be an execution target by the source code of the C language.

Figure 4:
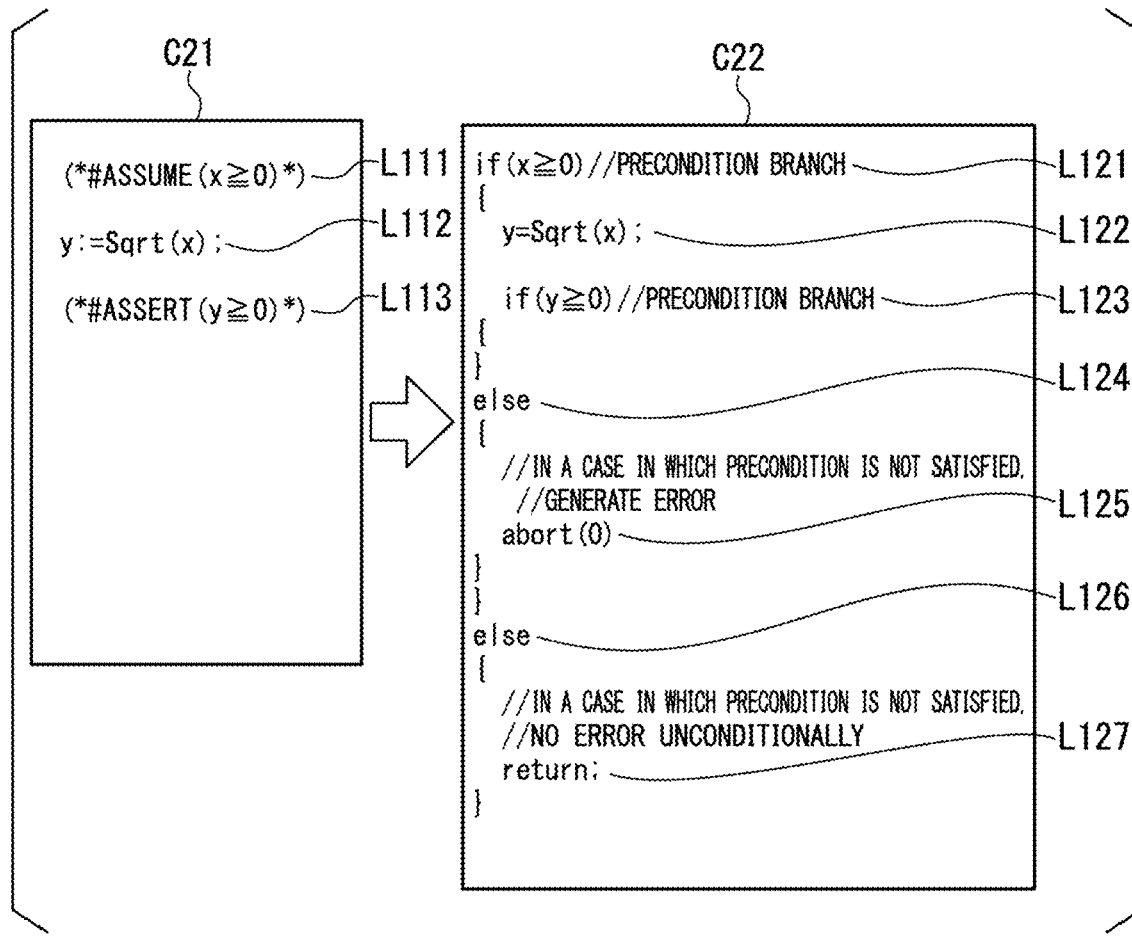
FIG. 4 is a diagram showing a second example of the program conversion by the software-testing device according to the embodiment.

FIG. 4 is a diagram showing a second example of the program conversion by the software-testing device 100. In the example of FIG. 4, a source code C21 of the ST is a source code before the conversion by the conversion unit 181, and a source code C22 of the C language is a source code after the conversion by the conversion unit 181.

The conversion unit 181 converts a line L112 indicating calculation of a square root in the source code of the ST into a line L122 in which the same process by the source code of the C language is performed. In addition, the conversion unit 181 converts a comment of the source code C21 of the ST into the description of the execution target by the source code C22 of the C language.

In the source code C21 of the ST, a description ("(* . . . *)") sandwiched by parentheses and asterisks in lines L111 and L113 is treated as the comment. Therefore, in the source code C21 of the ST, all of the lines L111 and L113 are out of the execution target. On the other hand, the conversion unit 181 converts the line L111 into an IF statement starting from the line L121, and converts the line L113 into an IF statement starting from the line L123.

A description of "#ASSUME" and a conditional expression of the line L111 indicate a precondition in the software-testing device 100. The precondition referred to here is a precondition for executing a program, such as a condition of an argument value and a condition of a global variable value in a subroutine when the subroutine is called. In a case of FIG. 4, a function Sqrt of the line L112 is a function that calculates the square root in a range of a real number. Therefore, it is a precondition that a value of an argument x of this function is 0 or more. Thus, in the line L111, "x≥0" is shown as the precondition.

In addition, a description of "#ASSERT" and a conditional expression of the line L 113 indicate a post-condition in the software-testing device 100. The post-condition referred to here is a condition to be satisfied after the execution of the program, such as a condition to be satisfied by a return value of the subroutine call. In a case of the example of FIG. 4, in a case in which the function Sqrt is executed normally, a value of a variable y indicating a calculation result may be 0 or more. Therefore, in the line L113, "y≥0" is shown as the post-condition.

At the time of the test of the program, the software-testing device 100 determines that there is a bug in a case in which the precondition is established and the post-condition is not established. In a case in which the precondition is not established, it is not determined that there is a bug in either of a case in which the post-condition is established or a case in which the post-condition is not established.

In order to perform these tests, in a case in which there is the description of "#ASSUME" in the comment of the source code of the ST, the conversion unit 181 converts this comment into a description indicating the precondition as the execution target rather than converting this comment into a comment of the C language.

In the example of FIG. 4, the conversion unit 181 converts the line L111 into an IF-ELSE statement starting from the line L121. In addition, the conversion unit 181 provides the line L122 corresponding to the line L112 that is a substantial part of the source code C21 in THEN of the IF-ELSE statement. The THEN of the IF-ELSE statement referred to here is a part executed in a case in which the IF condition is established.

In addition, the conversion unit 181 sets a case of ELSE as RETURN. The RETURN indicates that this program is to be ended, and indicates returning to a caller in a case in which it is called from a main program. Note that the source code C22 from "//" to the end of the line is treated as the comment and is not the execution target.

At the time of the test execution, the test execution unit 182 determines whether or not the precondition "x≥0" is established at the line L121. In a case in which the precondition is established, the test execution unit 182 executes the line L122 and the subsequent lines. On the other hand, in a case in which the precondition is not established, the process by the test execution unit 182 proceeds to "else" of a line L126, and ends the program of the source code C22 without an error by a RETURN statement of a line L127.

In addition, in a case in which there is the description of "#ASSERT" in the comment of the source code of the ST, the conversion unit 181 converts the description into a description that indicates the post-condition as the execution target instead of converting the description into the comment of the C language.

In the example of FIG. 4, the conversion unit 181 converts the line L113 into an IF-ELSE statement starting from the line L123. The IF-ELSE statement starting from the line L123 is executed after the execution of the line L122 at THEN of the IF-ELSE statement starting from the line L121 that is IF-ELSE statement of the precondition. That is, the IF-ELSE statement starting from the line L123 is executed after the execution of line L122 that is a substantial part of the source code C22.

In addition, the conversion unit 181 sets the THEN of the IF-ELSE statement starting from the line L123 to null. Therefore, in a case in which the post-condition is established at the time of the test execution, the test execution unit 182 ends the IF-ELSE statement as it is.

In addition, the conversion unit 181 sets a case of the ELSE of the IF-ELSE statement starting from the line L123 to abort (0). The abort (0) here indicates a program execution interruption due to an error.

In a case in which the test execution unit 182 executes the line L122 at the time of the test execution, the test execution unit 182 subsequently executes the IF-ELSE statement starting from the line L123. The test execution unit 182 determines whether or not the post-condition "y≥0" is established at the line L123. In a case in which the post-condition is established, the test execution unit 182 ends the IF-ESLE statement as it is described above. On the other hand, in a case in which the post-condition is not established, the test execution unit 182 proceeds to "else" of a line L124, outputs an error at abort (0) of a line L125, and interrupts the execution of the program.

In a case in which a symbol execution tool in the general-purpose language corresponds to "assume" and "assert", the conversion unit 181 may convert the descriptions of #ASSUME and #ASSERT into an assume command and an assert command, respectively.

Figure 5:
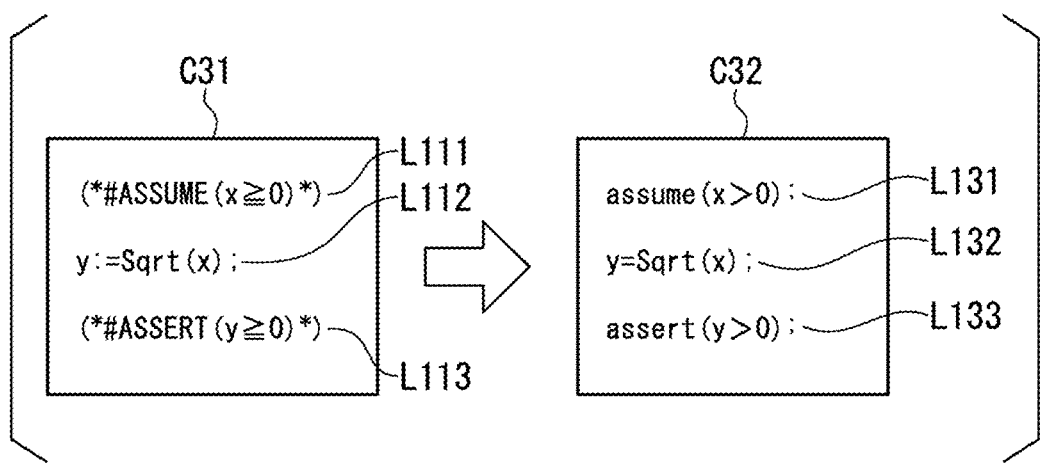
FIG. 5 is a diagram showing a third example of the program conversion by the software-testing device according to the embodiment.

FIG. 5 is a diagram showing a third example of the program conversion by the software-testing device 100. Lines L111, L112, and L113 of a source code C31 of the ST of FIG. 5 are similar to the lines L111, L112, and L113 of the source code C21 of the ST of FIG. 4.

The conversion unit 181 converts the lines L111, L112, and L113 of the source code C31 of the ST into lines L131, L132, and L133 of the source code C32 of the C language, respectively. The assume statement of the line L131 indicates a branch due to the precondition. Specifically, only in a case in which the precondition "x≥0" is established, the line L132 and the subsequent lines are executed.

The line L132 indicates calculation of a square root similarly to the line L122 of FIG. 4.

The assert statement of the line L133 indicates the determination whether or not the post-condition is established. Specifically, the test execution unit 182 detects a case in which the post-condition "y≥0" is not established as an error.

As described above, the conversion unit 181 converts the description that satisfies the predetermined condition among the descriptions included in the comment in the PLC program into the description to be the execution target by the general-purpose language program. This general-purpose language is used for the test. Therefore, the conversion unit 181 converts the description that satisfies the predetermined condition among the descriptions included in the comment in the PLC program into the description that is executed at the time of the test by the general-purpose language program. In the example of FIG. 4, each of including "#ASSUME" and the conditional expression, and including "#ASSERT" and the conditional expression corresponds to examples of the predetermined condition.

Therefore, when creating the PLC program, a user can include the description for the test which satisfies the predetermined condition in the comment. The software-testing device 100 can perform the test by converting the PLC program into the general-purpose language program and by reflecting the description for the test. On the other hand, at the time of an actual operation when the PLC executes the PLC program, the description for the test can be treated as the comment and it is possible to perform an operation without being affected by the description for the test.

In addition, the conversion unit 181 converts the first character string included in the comment in the PLC program into the description of the precondition for executing the general-purpose language program, and converts the second character string included in the comment in the PLC program into the description that indicates the condition to be satisfied after the general-purpose language program execution. In the example of FIG. 4, the description of "#ASSUME" and the conditional expression corresponds to the example of the first character string, and the IF-ELSE statement starting from the line L121 corresponds to the example of the description of the precondition for executing the general-purpose language program. In addition, in the example of FIG. 4, the description of "#ASSERT" and the conditional expression corresponds to the example of the second character string, and the IF-ELSE statement starting from the line L123 corresponds to the example of the description of the condition to be satisfied after the general-purpose language program execution.

In addition, the test execution unit 182 detects a case in which the input to the general-purpose language program satisfies the condition of the input and the output of the general-purpose language program does not satisfy the condition of the output as an error.

Therefore, the test execution unit 182 does not have to generate or select a test case in accordance with the program of the test target. In this regard, the test execution unit 182 can perform the test in various test cases, and can improve the coverage rate.

The test execution unit 182 may perform the test using the symbol execution method. Since the conversion unit 181 converts the source code of the ST into the source code of the C language, it is possible to use the existing tool for using the symbol execution method on the personal computer. It is possible to improve the accuracy of the test by using the symbol execution method.

The display unit 120 may display the PLC program, and the execution place in the general-purpose language program may be shown on the display of the PLC program. For example, the display unit 120 displays the source code C21 of the ST of FIG. 4. On the other hand, the test execution unit 182 performs the test using the source code C22 of the C language. The source code of the ST and the source code of the C language are associated with each other by a common syntax tree as described with reference to FIG. 2, and the execution place in the source code of the C language and the execution place in the source code of the ST can be displayed in association with each other.

Since the display unit 120 shows the execution place in the source code of the ST, a user who is familiar with the ST can easily ascertain the execution place.

Alternatively, the number of search steps in bounded model checking may be described in the comment of the ST. In addition, for each of paths of a designated number or less steps among the paths in the PLC program, the test execution unit 182 may calculate a variable value in a case in which the path is executed using the source code of the C language. The test execution unit 182 detects a case in which the variable value in any of the paths does not satisfy the condition indicated by the PLC program as an error.

As described above, it is expected that a defect in the program can be automatically detected by the test execution unit 182 performing the bounded model checking.

In addition, the test execution unit 182 may compare the value of the global variable with the assumption range of the value of the global variable, and may detect a case in which the value of the global variable is out of the assumption range as an error.

Figures 6, 7:
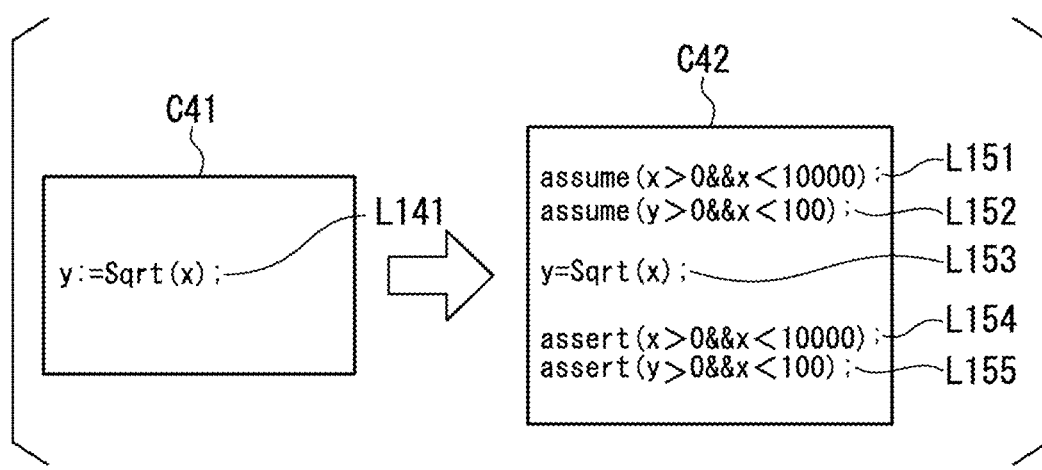
FIG. 6 is a diagram showing an example of a global variable list according to the embodiment.
FIG. 7 is a diagram showing a fourth example of the program conversion by the software-testing device according to the embodiment.

FIG. 6 is a diagram showing an example of a global variable list. In the example of FIG. 6, the global variable list is constituted as data of a table form, and a variable name, a type, a lower limit value, and an upper limit value of the global variable are stored. This global variable list corresponds to an example of range information indicating the assumption range of the value of the global variable.

For example, the operation input unit 130 receives a user operation indicating the assumption range of the global variable. The conversion unit 181 generates the global variable list on the basis of the range of the global variable indicated by the user operation. Alternatively, the communication unit 110 may communicate with another apparatus to acquire the global variable list.

When converting the source code of the ST into the source code of the C language, the conversion unit 181 provides the description of the precondition and the description of the post-condition in the source code of the C language with reference to the global variable list.

FIG. 7 is a diagram showing a fourth example of the program conversion by the software-testing device 100. In the example of FIG. 7, in a source code C41 of the ST, neither the precondition nor the post-condition is described only in calculation of a square root of a line L141. On the other hand, in a source code C42 of the C language, in addition to a line L153 corresponding to the line L141, lines L151 and L152 indicating preconditions of global variables and lines L154 and L155 indicating post-conditions of global variables are provided.

The conversion unit 181 provides a description of the preconditions of the lines L151 and L152 and a description of the post-conditions of the lines L154 and L155 with reference to the global variable of FIG. 6.

As described above, the operation input unit 130 acquires the range information indicating the assumption range of the value of the global variable included in the PLC program. The operation input unit 130 corresponds to an example of the range information acquisition unit. The test execution unit 182 detects a case in which the value of the global variable is out of the assumption range as an error.

As described above, by providing the precondition based on the global variable list in the source code of the C language, the test execution unit 182 does not have to generate or select a test case according to the program of the test target. In this regard, the test execution unit 182 can perform the test in various test cases, and can improve the coverage.

In addition, by providing the post-condition in the source code of the C language, the test execution unit 182 can more reliably determine the presence or absence of a defect of the program.

The conversion unit 181 may provide the precondition and the post-condition at a place of the program call such as a subroutine call.

Figure 8:
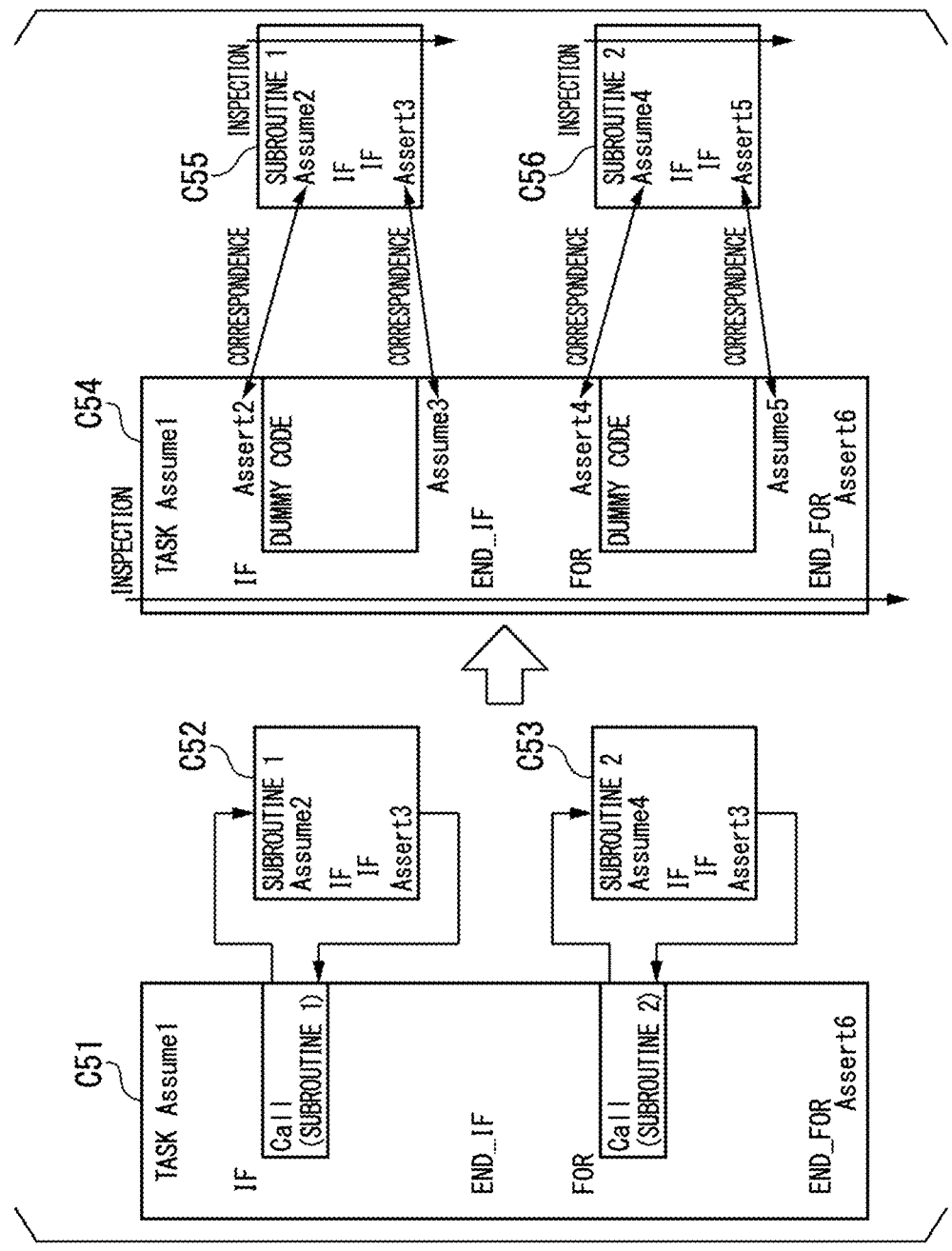
FIG. 8 is a diagram showing a fifth example of the program conversion by the software-testing device according to the embodiment.

FIG. 8 is a diagram showing a fifth example of the program conversion by the software-testing device 100. In the example of FIG. 8, the conversion unit 181 converts source codes C51, C52, and C53 of the ST into source codes C54, C55, and C56 of the C language.

At the time of start and end of each of the source codes C51, C52, and C53 of the ST, there are settings of each of the preconditions and the post-conditions. On the other hand, neither the precondition nor the post-condition is shown at the place of the subroutine call of the source code C51.

On the other hand, when the conversion unit 181 converts the source code C51 into the source code C54, the conversion unit 181 sets the post-condition and the precondition at the place corresponding to the subroutine call.

Specifically, the conversion unit 181 converts a precondition Assume2 of a subroutine call destination into a post-condition Assert2 at a place immediately before the subroutine call of the source code C55. In addition, the conversion unit 181 converts a post-condition Assert3 of the subroutine call destination into a precondition Assume3 at a place at the time of the return from the subroutine call of the source code C55.

Similarly, the conversion unit 181 converts a precondition Assume4 of the subroutine call destination into a post-condition Assert4 at a place immediately before the subroutine call of the source code C56. In addition, the conversion unit 181 converts a post-condition Assert5 of the subroutine call destination into a precondition Assume5 at a place at the time of the return from the subroutine call of the source code C56.

Furthermore, the conversion unit 181 replaces the subroutine call with a dummy code.

As described above, in a case in which the conversion unit 181 converts the subroutine call in the PLC program into the description in the general-purpose language program, the conversion unit 181 includes the entry condition indicated in the subroutine called by the PLC program in the general-purpose language program on the subroutine call side as the condition at the time of the subroutine call. In addition, the conversion unit 181 includes the exit condition indicated in the subroutine called by the PLC program in the general-purpose language program on the subroutine call side as the condition at the time of the return from the subroutine call. The test execution unit 182 performs a unit test of the general-purpose language program on the subroutine call side using the condition at the time of subroutine call and the condition at the time of the return from the subroutine call.

As described above, since the test execution unit 182 performs the unit test of each of the source codes C54, C55, and C56, it is expected that the path of the program becomes relatively short, and the coverage is improved.

In addition, when the test execution unit 182 performs the test, a low coverage place may be modularized to perform a unit test. The modularization referred to here constitutes a part of a program as one program.

Figure 9:
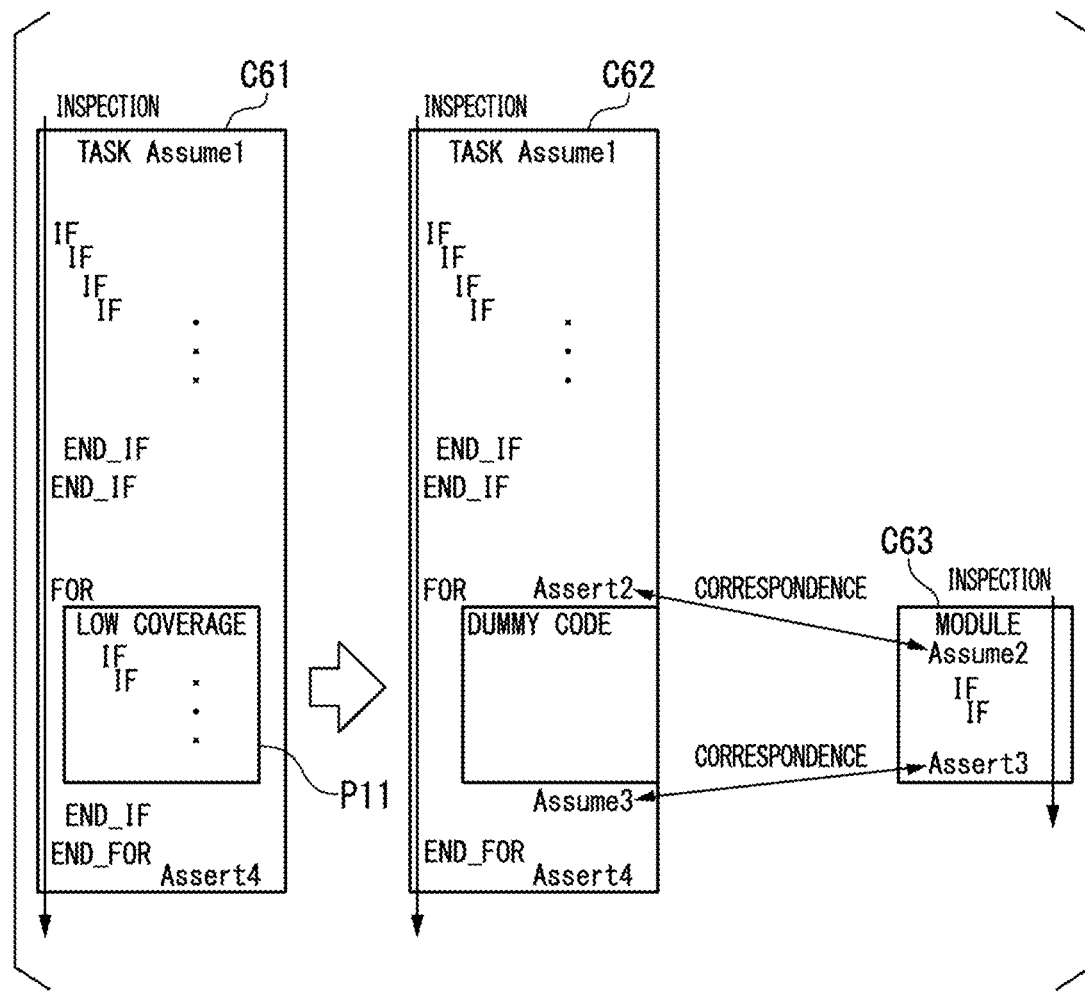
FIG. 9 is a diagram showing an example of modularization performed by a test execution unit according to the embodiment.

FIG. 9 is a diagram showing an example of the modularization performed by the test execution unit 182. All of source codes C61, C62, and C63 of FIG. 9 are source codes of the C language.

The test execution unit 182 first performs the test of the source code C61 of the C language. In a case in which the coverage of a portion P11 of the source code C61 is low in the test, the test execution unit 182 modularizes the portion P11. The source code C63 is a source code obtained by modularizing the portion P11. In addition, the test execution unit 182 replaces the portion P11 of the source code C62 with a dummy code.

Furthermore, the test execution unit 182 provides the precondition Assume2 and the post-condition Assert3 in the source code C63. For example, the test execution unit 182 extracts the precondition and the post-condition of the source code C63 using Symbolic Execution. Alternatively, the test execution unit 182 may acquire information on the precondition and the post-conditions in response to an inquiry to the user.

In addition, the test execution unit 182 converts the precondition Assume2 provided in the source code C63 into the post-condition Assert2 and provides the post-condition Assert2 immediately before the place where the modularization portion of the source code C62 is replaced with the dummy code. In addition, the test execution unit 182 converts the post-condition Assert3 provided in the source code C63 into the precondition Assume3 and provides the precondition Assume3 immediately after the place where the modularization portion of the source code C62 is replaced with the dummy code.

As described above, when the test execution unit 182 executes the test, the test execution unit 182 cuts out a path that did not pass in the test, and performs the test on the cut out path.

Therefore, the test execution unit 182 can perform the unit test on each of the source codes C62 and C63, and an improvement of coverage is expected.

Note that the test of the entire system including the PLC and the control target may be simulated by using the source code of the C language, which is generated by the software-testing device 100.

Figure 10:
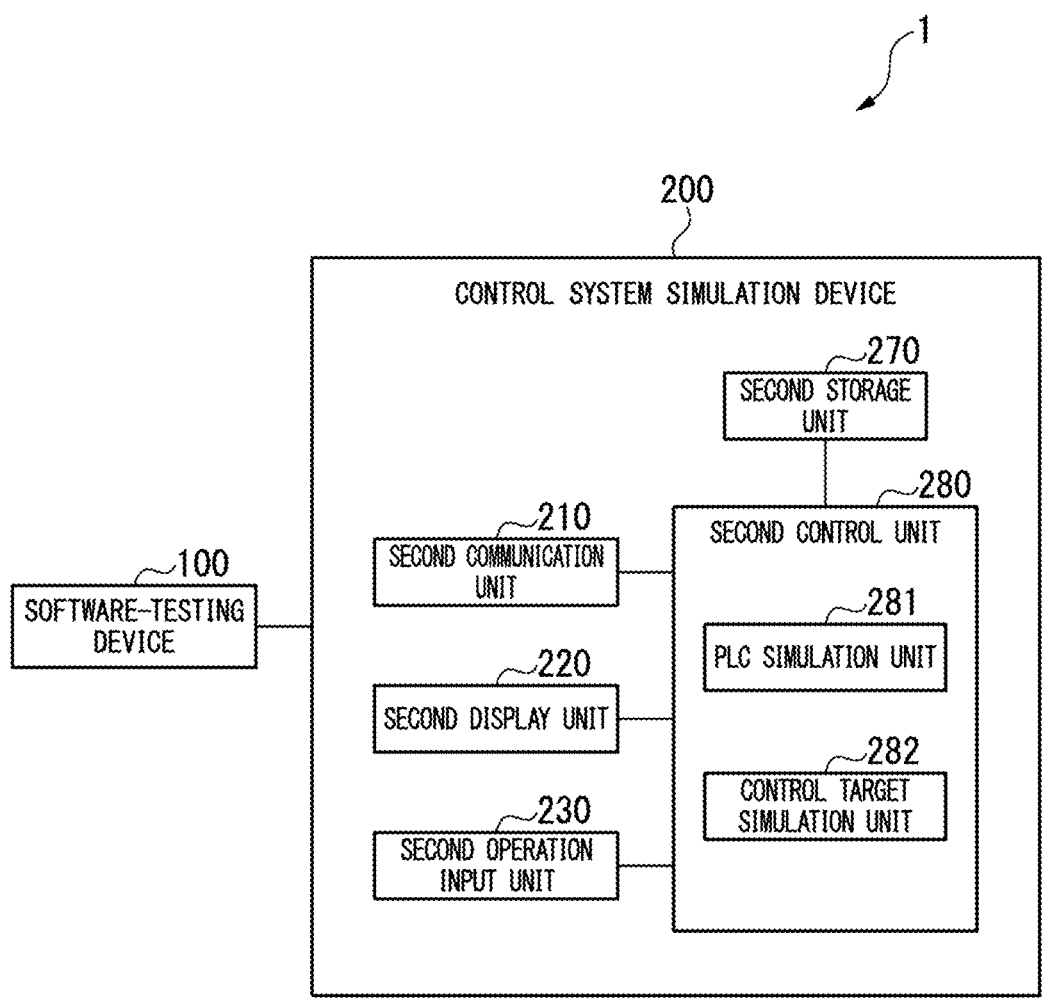
FIG. 10 is a schematic block diagram showing an example of a functional constitution of the software-testing system according to the embodiment.

FIG. 10 is a schematic block diagram showing an example of a functional constitution of the software-testing system. As shown in FIG. 10, the software-testing system 1 includes the software-testing device 100 and a control system simulation device 200. The control system simulation device 200 includes a second communication unit 210, a second display unit 220, a second operation input unit 230, a second storage unit 270, and a second control unit 280. The second control unit 280 includes a PLC simulation unit 281 and a control target simulation unit 282.

The software-testing system 1 is a system that performs the test of the program from the unit test to a system test. The software-testing device 100 among each of units of the software-testing system 1 is the same as the software-testing device 100 shown in FIG. 1, and the description thereof is omitted here.

The control system simulation device 200 performs the test of the entire system including the PLC and the control target by simulation. The control system simulation device 200 is constituted using, for example, a general-purpose computer such as a personal computer.

The second communication unit 210 communicates with other apparatuses. In particular, the second communication unit 210 communicates with the software-testing device 100, and receives the source code of the C language converted from the source code of the ST by the software-testing device 100.

The second display unit 220 includes a display screen such as a liquid crystal panel or an LED panel to display various images.

The second operation input unit 230 includes, for example, an input device such as a keyboard and a mouse to receive a user operation.

The second storage unit 270 stores various pieces of data. For example, the second storage unit 270 stores the PLC, a model for simulating the control target, and the source code of the C language received by the second communication unit 210 from the software-testing device 100.

The second storage unit 270 is constituted using a storage device included in the control system simulation device 200. The second control unit 280 controls each unit of the control system simulation device 200 to execute various processes.

The second control unit 280 is constituted by the CPU included in the control system simulation device 200 that reads the program from the second storage unit 270 and executes the program.

The PLC simulation unit 281 simulates the operation of the PLC. Specifically, the PLC simulation unit 281 simulates the control for the control target by executing the source code of the C language which is converted by the software-testing device 100 by using the PLC model stored in the second storage unit 270.

The control target simulation unit 282 simulates the operation of the control target. Specifically, the control target simulation unit 282 simulates the operation of the control target using the model of the control target stored in the second storage unit 270.

As described above, since the software-testing device 100 converts the source code of the ST into the source code of the C language, the software-testing device 100 can simulate the control by executing the source code on the personal computer using the source code of the C language, and can perform the system test by simulation.

Note that the processes of each unit may be performed by recording a program for realizing all or a part of the functions of the control unit 180 in a computer-readable recording medium, and causing a computer system to read and execute the program recorded in the recording medium. Note that the "computer system" referred to here is presumed to include an OS or hardware such as a peripheral device. In addition, the "computer system" also includes a homepage provision environment (or display environment) in a case in which a WWW system is used.

In addition, the "computer-readable recording medium" refers to a storage device such as a portable medium such as a flexible disk, a magneto-optical disc, a ROM, and a CD-ROM, or a hard disc that is installed inside the computer system. Furthermore, the "computer-readable recording medium" is also presumed to include a medium that dynamically stores a program for a short time, such as a communication line in a case of transmitting the program through a network such as the Internet or a communication line such as a telephone line, and a medium that stores a program for certain period of time, such as a volatile memory in a computer system that is a server or a client in that case. In addition, the program described above may also be for realizing a part of the function described above. Furthermore, the program may also be a program that can realize the function described above by combining a program that is already recorded in the computer system.

The embodiment of the present invention has been described in detail with reference to the drawings, but the specific constitution is not limited to this embodiment, and design changes and the like without departing from the gist of the present invention are also included.

INDUSTRIAL APPLICABILITY

An embodiment of the present invention relates to a software-testing device including a conversion unit configured to convert a PLC program for operating a programmable logic controller into a general-purpose language program described in a general-purpose programming language, and a test execution unit configured to perform a test on the general-purpose language program.

According to the embodiment, it is possible to improve coverage in the test of the program executed by the PLC.

REFERENCE SIGNS LIST

1 Software-testing system
100 Software-testing device
110 Communication unit
120 Display unit
130 Operation input unit
170 Storage unit
180 Control unit
181 Conversion unit
191 Parser generator
192 Parser
193 C language generator
182 Test execution unit
200 Control system simulation device
210 Second communication unit
220 Second display unit
230 Second operation input unit
270 Second storage unit
280 Second control unit
281 PLC simulation unit
282 Control target simulation unit

The invention claimed is:

1. A software-testing device, comprising:
a conversion unit configured to convert a PLC program for operating a programmable logic controller into a general-purpose language program described in a general-purpose programming language, and to convert a description satisfying a predetermined condition among descriptions included in a comment in the PLC program into a description that is to be an execution target by the general-purpose language program; and
a test execution unit configured to perform a test on the general-purpose language program,
wherein the conversion unit converts a first character string included in the comment in the PLC program into a description indicating a precondition for executing the general-purpose language program, and converts a second character string included in the comment in the PLC program into a description indicating a condition to be satisfied after the execution of the general-purpose language program, and
the test execution unit detects, as an error, a case in which an input to the general-purpose language program satisfies a condition of the input and an output of the general-purpose language program does not satisfy a condition of the output.

2. The software-testing device of claim 1, wherein the conversion unit converts the description satisfying the predetermined condition among the descriptions included in the comment in the PLC program into a description to be executed at a time of a test by the general-purpose language program.

3. The software-testing device of claim 1, comprising:
a range information acquisition unit configured to acquire range information indicating an assumption range of a value of a global variable included in the PLC program,
wherein the test execution unit detects a case in which the value of the global variable is out of the assumption range, as an error.

4. The software-testing device of claim 1, wherein the test execution unit performs the test using Symbolic Execution.

5. The software-testing device of claim 1, wherein the test execution unit calculates a variable value in a case in which a path is executed for each of the paths equal to or less than a designated step number among the paths in the PLC program using the general-purpose language program, and detects a case in which a variable value in any of the paths does not satisfy a condition indicated by the PLC program, as an error.

6. The software-testing device of claim 1, comprising:
a display unit configured to display the PLC program and show an execution place in the general-purpose language program on display of the PLC program.

7. The software-testing device of claim 1, wherein, in a case in which the conversion unit converts a subroutine call in the PLC program into a description in the general-purpose language program, the conversion unit adds an entry condition indicated in a subroutine called by the PLC program in the general-purpose language program on a subroutine call side as a condition at a time of the subroutine call, and adds an exit condition indicated in the subroutine called by the PLC program in the general-purpose language program on a subroutine call side as a condition at a time of return from the subroutine call, and
the test execution unit performs a unit test of the general-purpose language program on the subroutine call side using the condition at the time of the subroutine call and the condition at the time of the return from the subroutine call.

8. The software-testing device of claim 1, wherein, in a case in which the test execution unit executes the test, the test execution unit cuts out the path that did not pass in the test and performs the test on the cut out path.

9. A software-testing system, comprising:
the software-testing device of claim 1;
a PLC simulation unit configured to execute the general-purpose language program converted from the PLC program by the software-testing device; and
a control target simulation unit configured to simulate a control target by a PLC.

10. A software-testing method, comprising:
converting a PLC program for operating a programmable logic controller into a general-purpose language program described in a general-purpose programming language, the converting including converting a description satisfying a predetermined condition among descriptions included in a comment in the PLC program into a description that is to be an execution target by the general-purpose language program; and
performing a test on the general-purpose language program,
wherein a first character string included in the comment in the PLC program is converted into a description indicating a precondition for executing the general-purpose language program, and a second character string included in the comment in the PLC program is converted into a description indicating a condition to be satisfied after the execution of the general-purpose language program, and
a case in which an input to the general-purpose language program satisfies a condition of the input and an output of the general-purpose language program does not satisfy a condition of the output is detected as an error.

11. A non-transitory computer-readable recording medium storing a program for causing a computer to execute:
converting a PLC program for operating a programmable logic controller into a general-purpose language program described in a general-purpose programming language, the converting including converting a description satisfying a predetermined condition among descriptions included in a comment in the PLC program into a description that is to be an execution target by the general-purpose language program; and
performing a test on the general-purpose language program,
wherein a first character string included in the comment in the PLC program is converted into a description indicating a precondition for executing the general-purpose language program, and a second character string included in the comment in the PLC program is converted into a description indicating a condition to be satisfied after the execution of the general-purpose language program, and
a case in which an input to the general-purpose language program satisfies a condition of the input and an output of the general-purpose language program does not satisfy a condition of the output is detected as an error.

* * * * *